United States Patent [19]

Peterson

[11] 4,130,221
[45] Dec. 19, 1978

[54] TORSION SPRING DOOR FOR A VIDEOCASSETTE

[75] Inventor: Clyde V. Peterson, Hutchinson, Minn.

[73] Assignee: Minnesota Mining and Manufacturing Company, St. Paul, Minn.

[21] Appl. No.: 875,523

[22] Filed: Feb. 6, 1978

[51] Int. Cl.² .................. B65D 45/16; B65D 43/14; B65D 51/04
[52] U.S. Cl. .................................. 220/326; 220/335; 220/343; 16/168
[58] Field of Search ............... 220/326, 334, 336, 337, 220/342, 343; 206/387; 16/168

[56] References Cited

U.S. PATENT DOCUMENTS

| 3,187,925 | 6/1965 | Chaffee | 220/343 |
| 3,809,219 | 5/1974 | Esashi | 220/326 |

*Primary Examiner*—George T. Hall
*Attorney, Agent, or Firm*—Cruzan Alexander; Donald M. Sell; William L. Huebsch

[57] ABSTRACT

A torsion spring for biasing closed the door of a videocassette. A central portion of the spring provides the hinge pin for pivotably mounting the door, while its two ends are fixed respectively to the door and housing.

2 Claims, 2 Drawing Figures

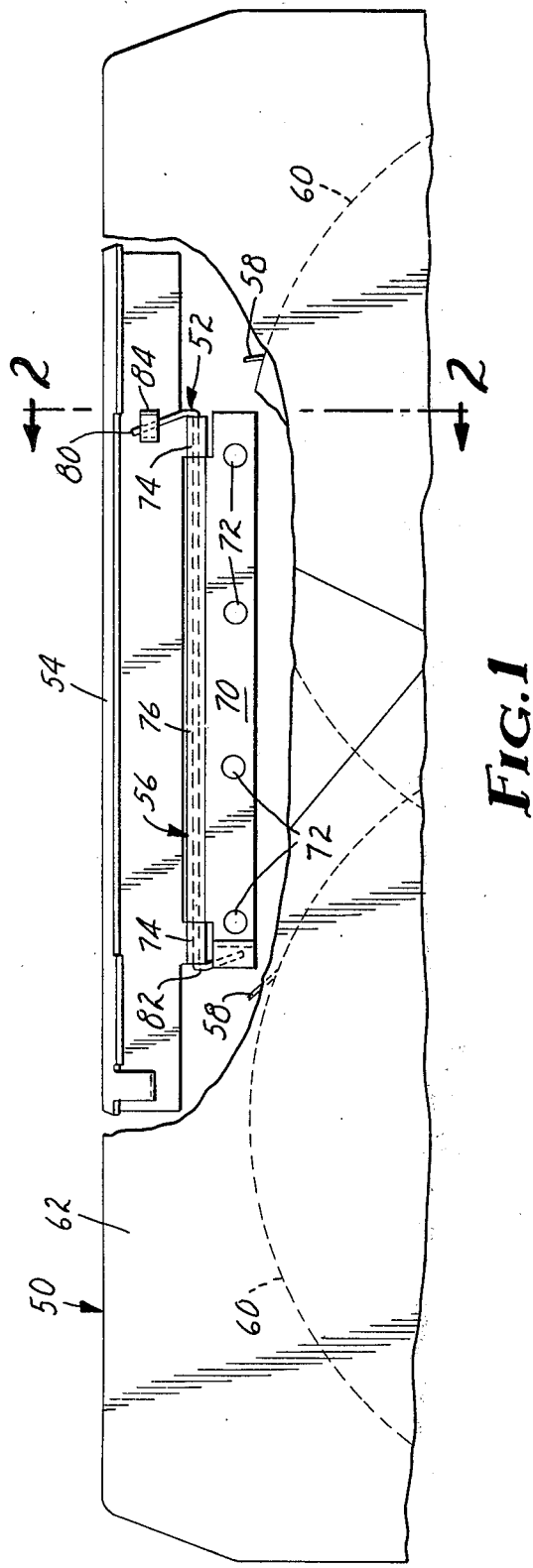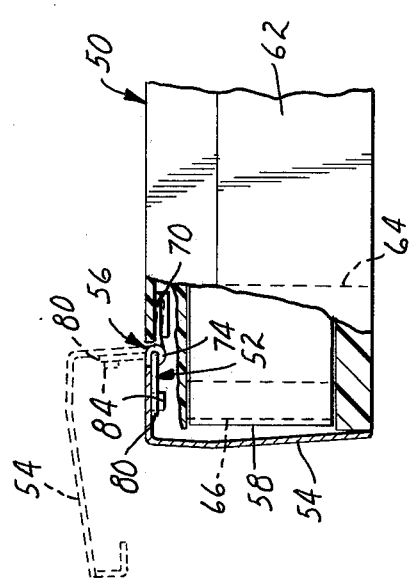

TORSION SPRING DOOR FOR A VIDEOCASSETTE

BACKGROUND OF THE INVENTION

This invention relates to the spring for biasing closed the access door on a videocassette of the type used in a video recording and playback machine, such as the "U-Matic" cassette developed by Sony Corporation.

As is best seen in FIG. 2 of U.S. Pat. No. 3,809,219, a prior art video tape cassette or videocassette 10 typically comprises a length 19 of magnetizable recording tape, two reels 17 and 18 each supporting a different helically wound end portion of the length 19 of tape, and a generally rectangular housing 11 enclosing and supporting the reels 17 and 18 for rotation to transfer tape between the reels 17 and 18. The housing 11 includes an outer front wall having generally planar end portions and a recessed portion 16 defining a tape access area along the outer surface of the housing 11, and guide pins 20 and 21 for guiding tape between the reels 17 and 18 through the outer wall and across the recessed portion 16 to afford access thereto by the mechanism 62 of a video tape recording/playback machine. A door 22 is pivotably mounted on the housing via a hinge assembly 25 for movement between a closed position over the length of tape 19a extending through the tape access area (FIG. 5 of U.S. Pat. No. 3,809,219) and an open position (FIG. 1) spaced from the tape access area, with the door 22 being biased to its closed position by a coil spring 25 tensioned between the housing 11 and the door 22.

While the use of such a coil spring is effective in biasing the door to its closed position, it is difficult to assemble into the cassette and thus adds to the cost of the cassette.

SUMMARY OF THE INVENTION

According to the present invention there is provided an improved spring for biasing closed an access door of a video tape cassette or videocassette, which spring also provides a portion of a hinge assembly for the door and is less costly and easier to assemble into a videocassette than the prior art coil spring described above.

The improved spring according to the present invention is for biasing closed the access door of a videocassette of the type described above, which door is pivotably mounted on a housing of the videocassette by a hinge assembly of a known type including a hinge plate fixed to the housing, and arcuate, generally hollow cylindrical axially aligned side portions of the door and of the hinge plate. The improved spring is a torsion spring including a straight central portion extending through the aligned hollow side portions of the door and hinge plate to provide a hinge pin for the hinge assembly, a first end portion fixed to the door, and a second end portion fixed to the hinge plate. Preferably the end portions of the torsion spring extend at generally right angles to its central portion, with one of its end portions being retained between the hinge plate and the housing and the other of its end portions being fixed to the door at a position spaced from its arcuate edge portion.

BRIEF DESCRIPTION OF THE DRAWING

The present invention will be further described with reference to the accompanying drawing, wherein like numbers refer to like parts in the several views, and wherein:

FIG. 1 is a fragmentary view of a videocassette including the improved spring according to the present invention and having parts broken away to shown details; and FIG. 2 is a fragmentary sectional end view taken approximately along lines 2—2 of FIG. 1 and rotated 180°, and which additionally shows in dotted outline the position of a door in the cassette when it is in its open position.

DESCRIPTION OF THE PREFERRED EMBODIMENT

Referring now to the drawing there is illustrated a video tape cassette or videocassette 50 similar to the videocassette illustrated in U.S. Pat. No. 3,809,219, but which includes a torsion spring 52 according to the present invention which biases a door 54 on the cassette 50 to its closed postion, and which also provides a hinge pin for a hinge assembly 67 mounting the door 54.

Like the prior art videocassette described above, the videocassette 50 includes a predetermined length of magnetizable recording tape 58, two reels 60 each supporting a different helically wound end portion of the length of tape 58, and a generally rectangular housing 62 enclosing and supporting the reels 60 for rotation to transfer tape between the reels 60. The housing 62 includes a front wall having a generally planar end portion and a recessed portion 64 defining a tape access area, and some guide pins 66 for guiding the tape 58 between the reels 60 through the outer wall and across the tape access area to afford access thereto by the record/playback mechanism of a machine into which the videocassette 50 is inserted. Also the videocassette 50 includes the door 54, the hinge assembly 56 which pivotably mounts the door 54 on the housing 62 for movement between a closed position over the tape access area and an open position spaced from the tape access area, and the torsion spring 52 which provides means for biasing the door 54 to its closed position.

The hinge assembly 56 comprises a hinge plate 70 fixed to the housing 62 via rivet-like projections 72 on the housing 62 which project through openings in the hinge plate 70 and have heat enlarged distal ends, and arcuate generally hollow cylindrical axially aligned side portions 74 and 76 of the door 54 and the hinge plate 70. The torsion spring 52 for biasing the door 54 to its closed position includes a straight central portion extending through the side portions 74 and 76 of the door and the hinge plate 70 to provide the hinge pin for the hinge assembly 56. Also, the torsion spring 52 has a first end portion 80 fixed to the door 54, and a second end portion 82 fixed to the housing 62. The end portions 80 and 82 of the torsion spring 52 extend at generally right angles to its central portion. The second end portion 82 is fixed to the housing 62 by being retained between an end of the hinge plate 70 and the housing 62, whereas the first end portion 80 is fixed to the door 54 at a position spaced from its arcuate edge portion 74 via a tab-like portion 84 of the door 54.

I claim:

1. In a videocassette comprising a length of magnetizable recording tape; two reels each supporting a different helically wound end portion of said tape; a generally rectangular housing enclosing and supporting said reels for rotation to transfer tape between said reels, said housing including an outer front wall having generally planar end portions, a recessed portion between said end portions and means for guiding tape between said reels through said outer wall and across said recessed portion to provide a tape access area; a door; a hinge assembly for pivotably mounting said door on said housing for movement between a closed position over said tape access area and an open position spaced from said tape access area comprising a hinge plate fixed to said housing, arcuate generally hollow cylindrical axially aligned side portions of said door and said hinge plate, and a hinge pin extending through said side portions; and a spring for biasing said door to its closed position, the improvement wherein:

said spring is a torsion spring including a straight central portion extending through the side portions of said door and hinge plate to provide said hinge pin, a first end portion fixed to said door, and a second end portion fixed to said housing.

2. A videocassette according to claim 1, wherein the end portions of said torsion spring extend at generally right angles to its central portion, said second end portion is fixed to said housing by being retained between said hinge plate and said housing and said first end portion is fixed to said door at a position spaced from its arcuate side portion.

* * * * *